United States Patent
Allistair et al.

(10) Patent No.: US 10,145,950 B2
(45) Date of Patent: Dec. 4, 2018

(54) FREQUENCY SHIFT KEYED CONTINUOUS WAVE RADAR

(71) Applicants: COLORADO SEMINARY, WHICH OWNS AND OPERATED THE UNIVERSITY OF DENVER, Denver, CO (US); Matthew J. Rutherford, Denver, CO (US); Moses A. Allistair, Denver, CO (US); Kimon P. Valavanis, Denver, CO (US)

(72) Inventors: Moses A. Allistair, Denver, CO (US); Kimon P. Valavanis, Denver, CO (US); Matthew J. Rutherford, Denver, CO (US)

(73) Assignee: Colorado Seminary, Which Owns and Operates the University of Denver, Denver, CO (US)

( * ) Notice: Subject to any disclaimer, the term of this patent is extended or adjusted under 35 U.S.C. 154(b) by 163 days.

(21) Appl. No.: 14/773,525

(22) PCT Filed: Mar. 10, 2014

(86) PCT No.: PCT/US2014/022602
§ 371 (c)(1),
(2) Date: Sep. 8, 2015

(87) PCT Pub. No.: WO2014/197026
PCT Pub. Date: Dec. 11, 2014

(65) Prior Publication Data
US 2016/0025845 A1    Jan. 28, 2016

Related U.S. Application Data

(60) Provisional application No. 61/775,194, filed on Mar. 8, 2013.

(51) Int. Cl.
*G01S 13/34* (2006.01)
*G01S 13/93* (2006.01)
(Continued)

(52) U.S. Cl.
CPC ............... *G01S 13/34* (2013.01); *G01S 7/03* (2013.01); *G01S 7/354* (2013.01); *G01S 7/415* (2013.01);
(Continued)

(58) Field of Classification Search
CPC ........ G01S 13/04; G01S 13/32; G01S 13/325; G01S 13/34; G01S 13/348; G01S 13/50;
(Continued)

(56) References Cited

U.S. PATENT DOCUMENTS 5,581,250 A    12/1996  Khvilivitzky
5,592,170 A *   1/1997  Price ...................... F41H 11/16
                                                        342/22

(Continued)

FOREIGN PATENT DOCUMENTS

WO      2012149035 A2    11/2012
WO      WO-2012149035 A2 * 11/2012 ......... G01S 13/9303

OTHER PUBLICATIONS

Extended European Search Report for Application No. 14807084.0 dated Mar. 3, 2016, from the European Patent Office.
(Continued)

*Primary Examiner* — Peter M Bythrow
*Assistant Examiner* — Daniel P Malley, Sr.
(74) *Attorney, Agent, or Firm* — Neugeboren O'Dowd PC

(57) ABSTRACT

A RADAR apparatus may be used in target detection and/or avoidance. The RADAR apparatus may include a microwave front end configured to transmit and receive RF signals, an analog signal conditioning module coupled with the microwave front end module that conditions RF signals
(Continued)

received at the microwave front end module, and a digital signal processing module coupled with the analog signal conditioning module that detects presence and range of one or more targets based on the filtered RF signals.

11 Claims, 10 Drawing Sheets

(51) Int. Cl.
    *G01S 7/03*     (2006.01)
    *G01S 7/41*     (2006.01)
    *G01S 13/58*     (2006.01)
    *G01S 7/35*     (2006.01)
    *G01S 13/04*     (2006.01)

(52) U.S. Cl.
    CPC ............ *G01S 13/04* (2013.01); *G01S 13/348* (2013.01); *G01S 13/584* (2013.01); *G01S 13/9303* (2013.01)

(58) Field of Classification Search
    CPC .. G01S 13/583; G01S 13/584; G01S 13/9303; G01S 7/03; G01S 7/032; G01S 7/292; G01S 7/2925; G01S 7/352; G01S 7/354; G01S 7/41; G01S 7/412; G01S 7/415; G01S 7/417; G01S 7/418; G08G 5/0069
    See application file for complete search history.

(56) References Cited

U.S. PATENT DOCUMENTS

| | | | | |
|---|---|---|---|---|
| 6,127,965 A * | 10/2000 | McDade | ............... | G01S 13/931 342/104 |
| 6,618,449 B1 | 9/2003 | Laviec et al. | | |
| 7,289,060 B1 * | 10/2007 | Abatzoglou | ............ | G01S 7/412 342/175 |
| 7,542,812 B2 * | 6/2009 | Stroili | ..................... | G01S 7/032 342/13 |
| 2005/0046584 A1 * | 3/2005 | Breed | ..................... | B60C 11/24 340/13.31 |
| 2010/0198514 A1 * | 8/2010 | Miralles | .................. | F41G 7/008 701/302 |
| 2011/0006984 A1 * | 1/2011 | Perbet | ..................... | F41G 3/225 345/158 |
| 2012/0092208 A1 | 4/2012 | LeMire et al. | | |

OTHER PUBLICATIONS

International Search Report of International Application No. PCT/US2014/022602 dated Dec. 8, 2014 from the Korean Intellectual Property Office.

\* cited by examiner

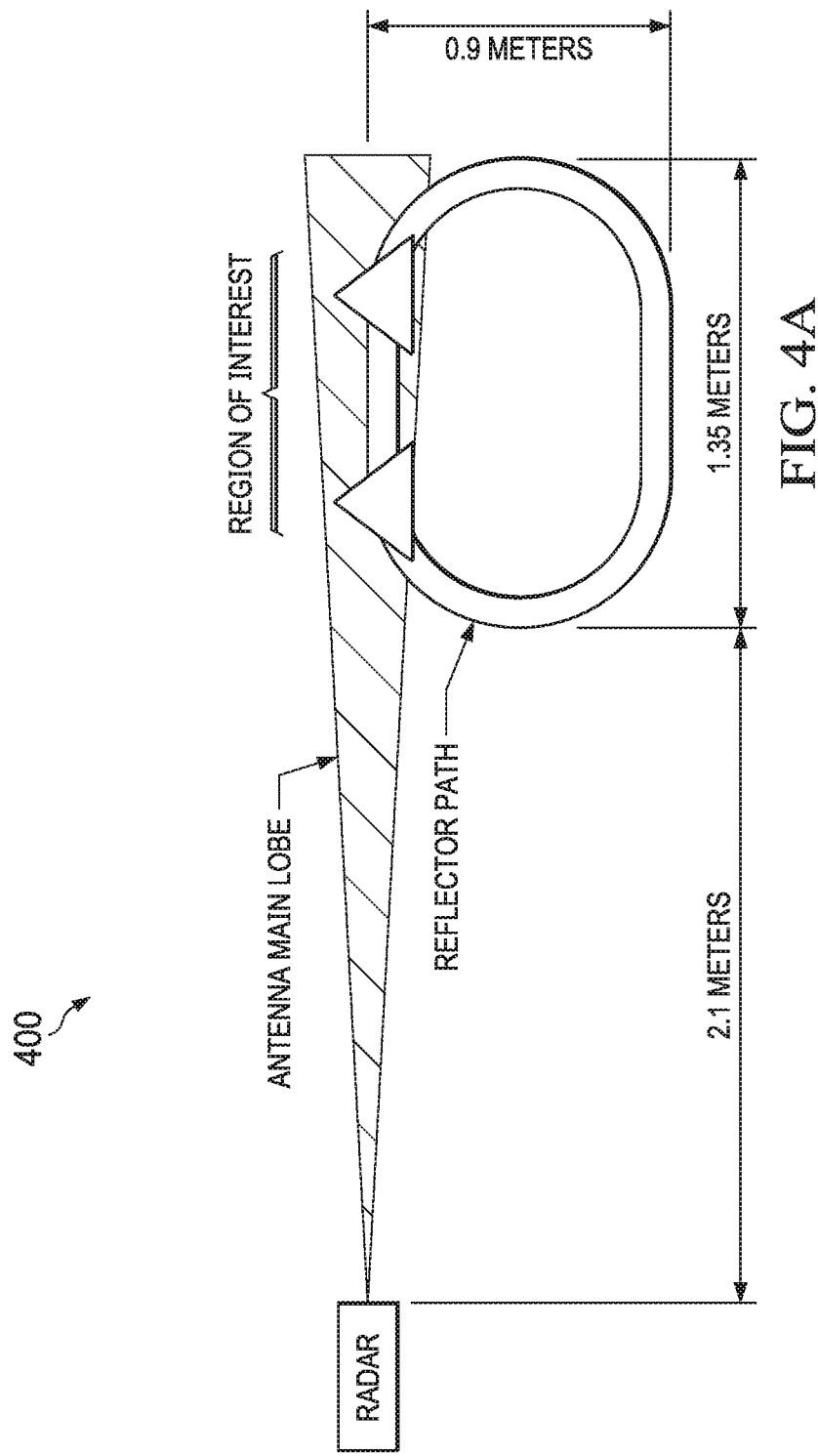

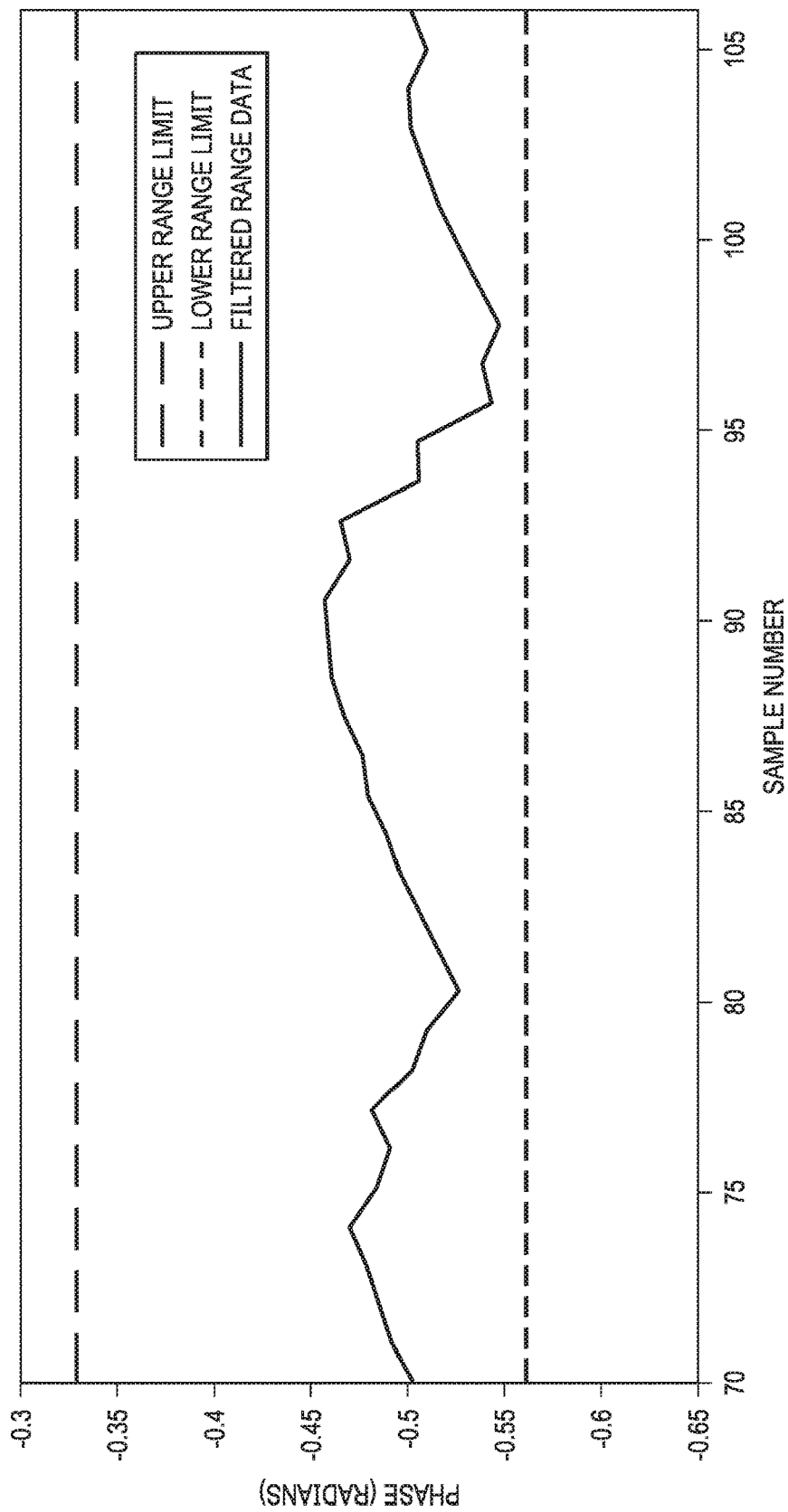

FREQUENCY SHIFT KEYED CONTINUOUS WAVE RADAR

CROSS-REFERENCES

This application is a US National phase of pending application PCT/US2014/022602, filed Mar. 10, 2014, entitled "FREQUENCY SHIFT KEYED CONTINUOUS WAVE RADAR," which claims priority from provisional Patent Application No. 61/775,194, filed Mar. 8, 2013, entitled "FREQUENCY SHIFT KEYED CONTINUOUS WAVE RADAR FOR MINIATURE AIR VEHICLES" which are hereby incorporated by reference, as if set forth in full in this document, for all purposes.

FIELD

Embodiments of the present invention generally relate to Radio Detection and Ranging (RADAR) systems, and, more particularly, RADAR systems that identify objects using Frequency Shift Keyed Continuous Wave (FSK-CW) transmissions.

BACKGROUND

RADAR systems are well known object-detection systems that employ radio waves to determine the range, altitude, direction, and/or speed of objects. For example, RADAR systems may be used to detect aircraft, ships, motor vehicles, weather formations, and/or terrain.

RADAR systems may be ground based (e.g., mounted on a platform or vehicle that is on the ground), or may be air based (e.g., mounted on an aircraft or other aerial platform). Depending upon the target that a RADAR system is interested in detecting, various different types of RADAR may be used. For example, unmanned aerial vehicles (UAVs) are well known, remotely operated platforms that may be used for many tasks. UAVs can be relatively small, allowing for relatively small landing and take-off areas, and can have a relatively small RADAR cross section (RCS) thus allowing operation in potentially dangerous areas with reduced likelihood of detection and without risking a human pilot. Such UAVs are commonly used in remote surveillance or monitoring operations, to obtain intelligence about activity in an area, or monitor the status of assets or people in a particular area. For example, UAVs may be used in intelligence gathering operations at relatively low altitudes in hostile territory. Another exemplary application of a UAV is monitoring operations, such as monitoring of a border between countries or monitoring assets like pipelines or a convoy which may be targeted by hostile parties. UAVs may be fixed wing aircraft, or rotary-wing aircraft. Furthermore, UAVs may be operated with reduced requirements for take-off and landing areas.

Interest in unmanned aerial systems for a multitude of applications has seen consistent increases in recent years. This interest, combined with the increasing availability of such systems, may lead to a future in which the risk of mid-air collisions between UAVs and other aircraft (both manned and unmanned) is increasingly likely. While measures have been taken to ease the integration of UAVs into existing airspace (e.g., improved communication between air traffic controllers, on board transponders, etc.) the limitations of currently available UAV sensors and the limitations of the remote operator's situational awareness result in a situation in which there is a lack of sufficient redundancy for collision avoidance in UAV systems. The situation worsens as the physical size of UAVs decreases and the sensor options become more limited. Furthermore, the majority of current solutions require cooperative use of transponders or other hardware installations on-board an already payload limited vehicle.

SUMMARY

A miniature, scalable FSK-CW RADAR suitable for target detection and identification is provided. Exemplary systems utilize commodity hardware to build the RADAR resulting in an inexpensive and lightweight device with narrow bandwidth requirements. The RADAR may be utilized to detect the presence and range of one or more targets, and may be coupled with a controller to provide collision avoidance capabilities.

According to an exemplary set of embodiments, a radar apparatus, may include a microwave (or Radio Frequency (RF)) front end module configured to transmit and receive FSK-CW signals; an analog signal conditioning module coupled with the RF front end module that conditions RF signals received at the RF front end module; and a digital signal processing module coupled with the analog signal conditioning module that detects the presence and range of one or more targets based on the conditioned RF signals. One or more of the modules may be mounted to a ground-based platform or an aerial platform such as a UAV. In certain examples, the digital signal processing module may identify one or more signatures based on the conditioned RF signals and identify one or more targets based on the signatures. For example, the digital signal processing module may execute signature matching algorithms for differentiating targets by their Doppler signature. Such signature matching algorithms may compare a received signature against a number of prerecorded signatures that may be stored in a memory.

According to another exemplary set of embodiments, a method for target detection may include receiving RF signals at an antenna of a RADAR system; filtering the received RF signals to one or more frequencies of interest; comparing the filtered RF signals to known signal fingerprints; and identifying one or more targets based on the comparison. The comparing may include, in some examples, determining a Doppler signature of one or more targets in the received RF signals and executing signature matching algorithms for differentiating targets by their Doppler signature.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 4A is an illustration of an object within a region of interest of a UAV according to various embodiments.

FIG. 4B is a graph showing results of an exemplary test in which filtered phase data are depicted within acceptable phase bounds.

Figure 1:
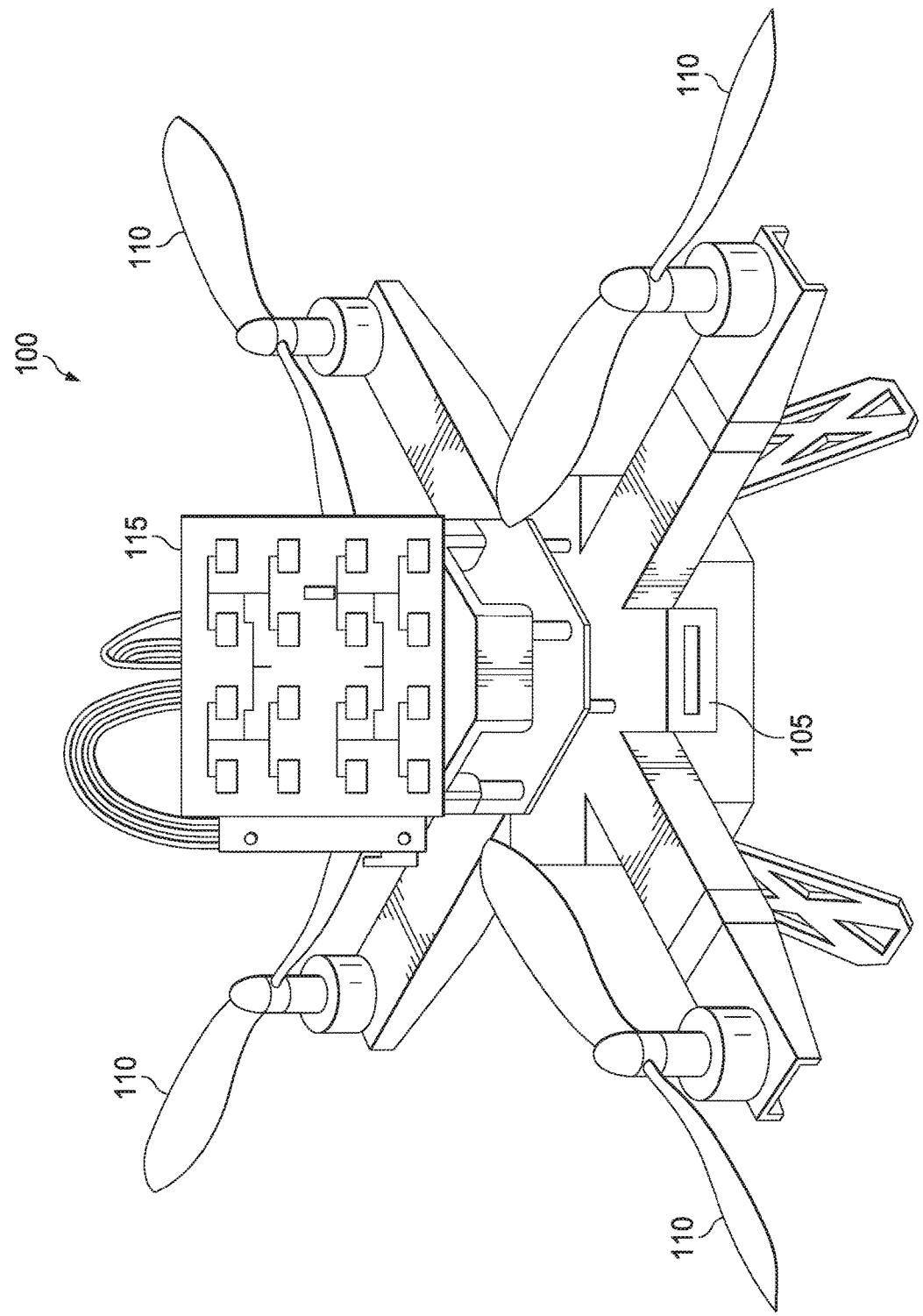
FIG. 1 is an illustration of an exemplary unmanned aerial vehicle and a RADAR of one set of embodiments.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

The present disclosure recognizes that target detection using ground-based or aerial-based RADAR systems may be desirable. For example, in many civilian applications for UAVs it may be desirable to use relatively small systems, so as to provide a Maximum Take-Off Weight (MTOW) of, for example, less than about 20 kilograms. It may also be desirable that civilian UAVs be safely operated by individuals or small teams with little formal training. Due to the perceived risks to public safety introduced by UAVs, and to the relative lack of training of their crews, it may be desirable to control such UAVs with increased levels of autonomy and intelligence, such as with regard to risk mitigation capabilities, for example. Additionally, it may be desirable to provide for UAV integration into the National Air Space (NAS) with multiple, complementary sense-and-avoid mechanisms (e.g., both vision- and RADAR-based systems).

The present disclosure provides, according to various embodiments, RADAR systems that are (1) suitable for ground-based and/or small UAV integration (i.e., low mass and volume), (2) sensitive enough to detect UAV-sized vehicles, and (3) intelligent enough to identify and differentiate between different classes.

Various types of sensors are well known and useful for detection of objects, such as aerial and/or ground vehicles or objects. For example, cameras and other optical systems, RADAR-based systems, and sonar systems may provide sensing capability. Each type of system provides different types of information that may be used to detect targets of interest, such as, for example, UAV-sized aerial vehicles. Each type of system may have various advantages and drawbacks. For example, visible spectrum cameras and other optical equipment may be adversely affected by changing sunlight conditions and other environmental factors (e.g., smoke, fog, dust), limiting their ability to detect targets. Optical systems using other parts of the spectrum (i.e., long and short wave infrared) may be used in conjunction with visible spectrum data to compensate for some of these limitations. Optical systems may, however, require computationally intensive operations to analyze data and provide detection of targets. In various embodiments disclosed herein, one or more types of sensor systems, such as optical systems and/or sonar-based systems, may be used in conjunction with RADAR-based detection systems of various embodiments that are described herein.

Within the realm of manned, commercial aircraft, mid-air collisions are mitigated through a system known as the Traffic Collision Avoidance System (TCAS) and its successor, Automatic Dependent Surveillance-Broadcast (ADS-B). TCAS and ADS-B function by means of on-board RF transponders and cockpit instruments that direct the pilot to make altitude changes to avoid a collision. TCAS systems are widely adopted for commercial aircraft, although the use of the most basic TCAS systems is not required for piston engine aircraft with fewer than 10 seats, according to present day regulations. Furthermore, most UAV systems are not equipped with the TCAS system. The present disclosure recognizes that if UAV systems that are desired to co-exist with general aviation aircraft were equipped with simple RADAR systems, then a new option for improving safety would be available. Furthermore, many present day systems that may be used as UAV RADAR systems, have a relatively high cost and high mass, thus making them impractical for many miniature UAV applications.

Various embodiments described herein allow collision avoidance behaviors on UAVs with low-cost hardware enabled to provide integration into the National Airspace System (NAS). The solution according to some embodiments provides that, when a collision course between a manned and an unmanned vehicle is detected, the manned vehicle will automatically be given priority and the unmanned vehicle will automatically perform a collision avoidance maneuver. This approach may provide enhanced effectiveness because manned aircraft typically are less capable of the rapid, sustained high-g, maneuvers that some UAVs can perform. Moreover, an automated system as described for various embodiments may be capable of continuous monitoring throughout the entire flight regardless of operator workload or mental state.

The present disclosure provides, according to various embodiments, RADAR systems adapted to perform both target detection and identification. Such systems may be ground-based systems, or may be small and lightweight enough to be carried by a relatively small UAV. The systems described in embodiments herein may address the airborne sense-and-avoid problem, and in some embodiments may act as a Synthetic Aperture Radar (SAR) imager or RADAR altimeter. With respect to RADAR systems, continuous wave (CW) RADAR types can typically operate with lower RF transmit powers relative to certain types of pulsed RADAR systems. In order to obtain range information in a CW RADAR system, a carrier wave is modulated in some fashion. The method for accomplishing this varies but, according to various embodiments, involves applying an analog signal to a Voltage Controlled Oscillator in an RF section. The manner in which range information is extracted is dependent on the modulation pattern. Some embodiments may use Frequency Modulated Continuous Wave (FMCW). FMCW operates by modulating the transmit frequency in a triangular fashion and down-converting the received signals by mixing them with the transmitted signal. Due to the finite speed of light, the ranges of objects manifest as frequency shifts in the Intermediate Frequency (IF) signal. This is true because for any given target with a range greater than zero, if the transmitted signal is being modulated in a linear fashion, the received signal will differ from the transmitted signal by an amount proportional to the modulation rate. FMCW RADAR types, while they can be produced in rather small packages, generally require fairly wide bandwidths (100's of MHz). This may cause problems as the population density of RADAR sensors is increased. According to various embodiments, the population density problem is addressed through the selection a modulation method that utilizes similar hardware in order to take advantages of relatively wide component availability while also occupying substantially smaller bandwidths. According to some embodiments, a Frequency Shift Keyed Continuous Wave (FSK-CW) RADAR is provided that provides desired characteristics.

FSK-CW RADARs operate by rapidly switching the transmit frequency $F_T$ between two adjacent frequencies (separated by a few MHz) while sampling the IF synchronously with $F_T$. This results in two signal vectors corresponding to $F_{TA}$ and $F_{TB}$. FSK-CW RADARs can be envisioned as two Doppler mode RADARs operating with co-located antennas and operating with a frequency separation of $F_{TA}$-$F_{TB}$. As with CW Doppler RADARS, for detection to occur, there must be some relative motion between the target of interest and the RADAR antenna. This motion will give rise to a frequency at the IF port ($F_{IF}$), described by Equation 1 for subluminal targets observed by a monostatic RADAR arrangement.

$$F_{IF} = 2v\left(\frac{F_T}{C}\right) \quad (1)$$

As the modulation bandwidth is generally small, moving targets will generally manifest in the IF with marginal Doppler shifts but with different phase shifts. The relationship between the range and the phase is described by Equation 2

$$R = \frac{c(\phi_A - \phi_B)}{4\pi(F_{T_A} - F_{T_B})} \quad (2)$$

where c is the speed of light and $\phi_n$ is the phase shift of the IF corresponding to transmit frequency $F_{Tn}$. Equation 2 shows that due to the cyclical nature of phase comparison with sinusoids, there exists a range beyond which, the phase difference $\phi_A$-$\phi_B$ will repeat. This ambiguous range limit is described by Equation 3.

$$R_{unamb} = \frac{c}{2(F_{T_A} - F_{T_B})} \quad (3)$$

Utilizing the above principles, an FSK-CW implementation may have a number of characteristics. In relation to inputs including target velocity and range, $F_{IF}$ signal vectors may be generated. In some examples, $F_{TA}$ $F_{TB}$ is set to 3.768 MHz. Additive White Gaussian Noise (AWGN) may be present in the signal with a SNR of, for example, 6 dB. The signal at this point is essentially a noisy sine wave with a frequency corresponding to the Doppler shift induced by the target motion. At this stage, 1024 samples of the simulated signal are acquired at 15 kHz and a Hamming window is applied. IF Signal Processing continues with the transformation of both $\phi_A$ and $\phi_B$ to the frequency domain utilizing the complex FFT, for example. The spectra is then searched for the dominant frequency which corresponds to the bulk velocity of a given target within the main lobe. The phase shift is then taken at the spectral peak. Due to both the signal noise and the discrete nature of the data acquisition, the phase information may be particularly noisy and therefore must be filtered prior to use. A scalar Kalman filter, according to some examples, handles the task of filtering the phase data prior to its conversion to range information. In some embodiments, a Kalman filter is selected based on relatively low memory requirements, and lower processing power requirements compared with alternatives such as particle filters.

As the RADAR provides target velocity information in addition to range, these parameters may be incorporated into the filter's state transition model. The estimated phase difference according to some embodiments may be described by Equation 4

$$\phi = \frac{4\pi\left(R_{(k-1)} + c\left(\frac{F_{IF}}{2F_T}\right)(T_k - T_{k-1})\right)}{c} \quad (4)$$

where $\phi$ is the predicted phase shift and $R_{(k-1)}$ represents the previous range value taken at time $T_{(k-1)}$.

To gather more information regarding the sensor noise, the signal generation and phase comparison procedure, according to various embodiments, is repeated non-iteratively in an offline simulation of the FSK-CW modulation process. The random nature of the AWGN introduced into the IF signal produces noise in the phase measurement which may be then used to tune the Kalman filter. Once the variance of the phase noise has been determined, the values gathered during simulation can be used to filter real time data in real world scenarios. According to some examples, the filter converges after 8 phase measurements, if $F_{IF}$ is sampled at 15 kHz, This takes approximately 0.55 seconds. After convergence, the typical phase error is −0.00536 radians, according to some examples. This is equivalent to a range error of 0.26 meters.

Radar Sensor Hardware

Figure 2:
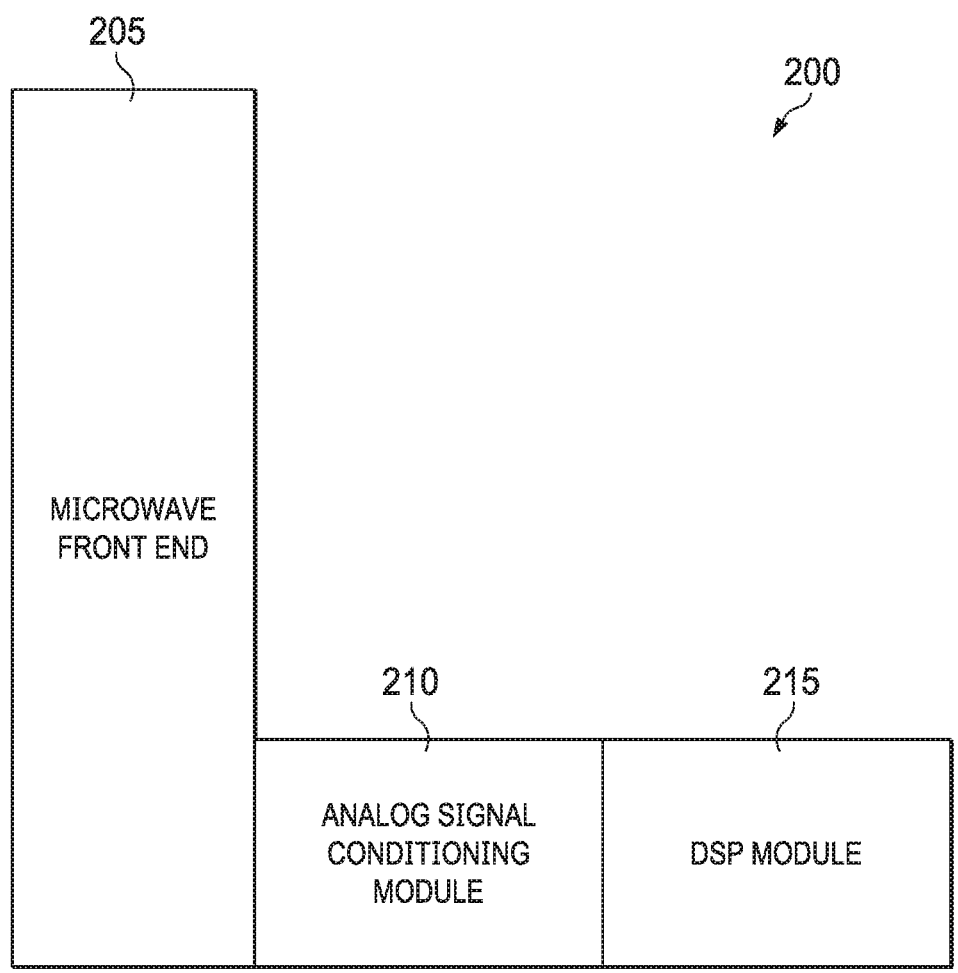
FIG. 2 is a block diagram of the operational modules included in an exemplary RADAR apparatus.

According to various embodiments, a RADAR is provided that is may provide target detection and/or identification using FSK-CW techniques. Such a RADAR may be a ground-based radar system or an aerial-based system. In some examples, a RADAR system may be mounted on a small-scale UAV. FIG. 1 provides an illustration 100 of a small UAV 105, in this example a quad-rotor UAV having four rotors 110. While various of the exemplary embodiments described herein are discussed in relation to a system that is mounted on a UAV, it is to be understood that the disclosure is not limited to UAV-based systems, and that systems and methods such as described herein may be mounted and/or performed on ground-based platforms or larger aerial vehicle platforms, for example. With continued reference to FIG. 1, the UAV 105 includes a RADAR 115 according to various embodiments. The RADAR 115 may be divided into three main components, as represented in the diagram 200 of FIG. 2. The three main components of such embodiments include: a microwave front end 205, analog signal conditioning module 210, and a Digital Signal Processor (DSP) module 215. The microwave front end, according to some embodiments, includes a Dielectric Resonant Oscillator (DRO)-based Voltage Controlled Oscillator (VCO) feeding a fixed phase, planar, patch antenna array. A down-converting mixer's RF port is fed by an adjacent, identical patch antenna array and the Local Oscillator (LO) signal is supplied by the VCO output via a coupler. The specifications of this exemplary embodiment are shown in Table I.

TABLE I

| | |
|---|---|
| Center Frequency | 10.587 GHz |
| Transmit Power | 0.4 mW |
| Tuning Bandwidth | 5 MHz |
| Receiver Sensitivity | −92 dBm |
| Antenna Gain | 14 dBi |

Figure 3:
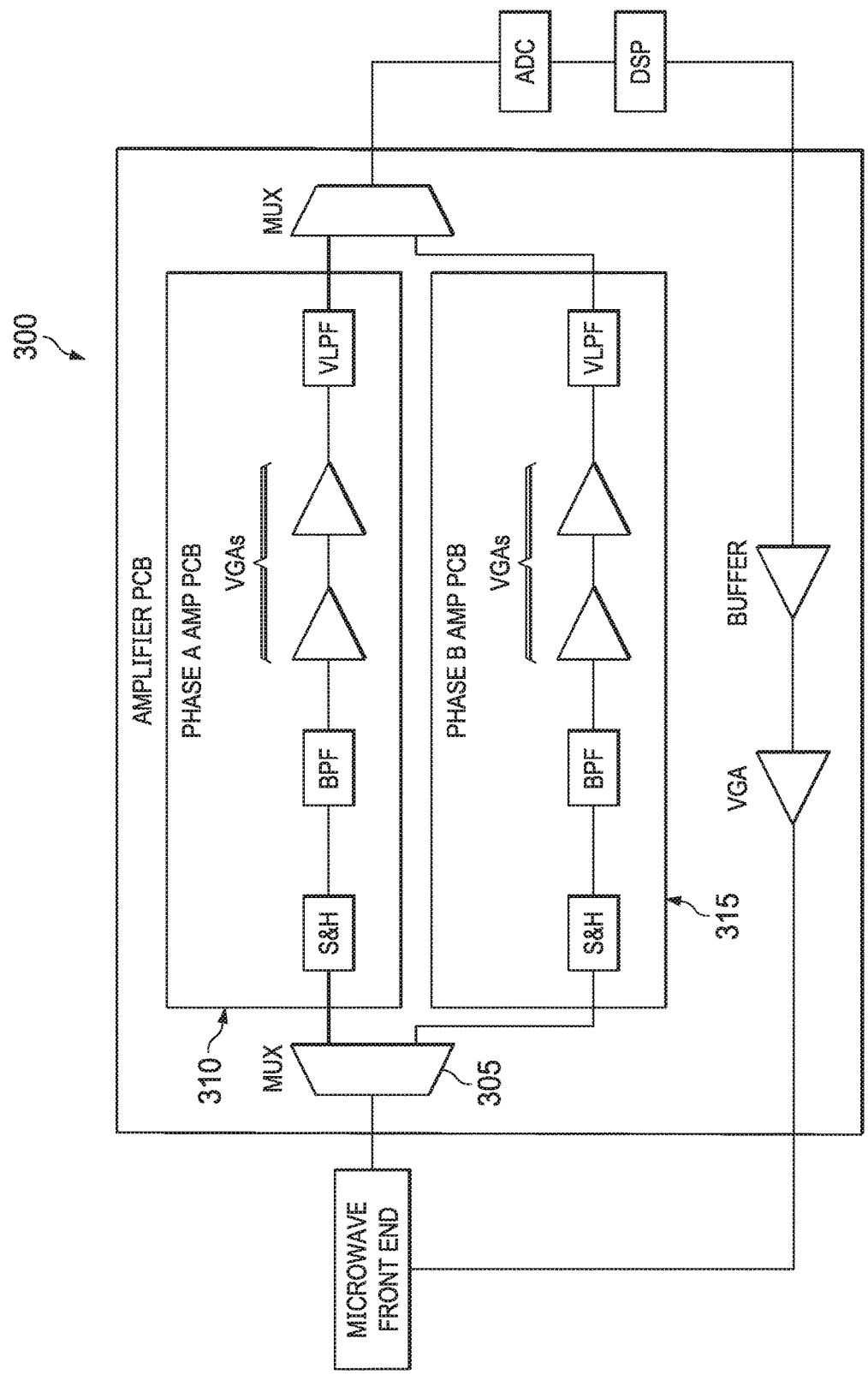
FIG. 3 is a block diagram of an RF module and processing module according to various embodiments.

With reference now to FIG. 3, analog signal conditioning hardware 300 according to an embodiment serves two generalized functions: conditioning of the IF signal, and conditioning the $F_T$ modulation signal from the DSP. Conditioning the IF signal begins by multiplexing the analog signal at MUX 305 to two conditioning circuits 310 and 315, each housed on separate PCBs in this example in order to separate phases A and B thus isolating them from crosstalk and other forms of interference. Sample and hold circuits (S&H) store the analog voltage while the MUX is disconnected. Phases A and B are then passed through a Band Pass Filter (BPF) to remove the DC components and the higher order mixing products. The filtered signals are subsequently amplified by cascaded Variable Gain Amplifiers (VGAs) whose gain is controlled by the DSP. The overall voltage gain in this stage, according to some embodiments, reaches a maximum of 85 dB. Subsequently, the signal is filtered by a variable cut-off frequency low pass filter (VLPF), also controlled by the DSP. This filter serves to prevent aliasing and the cut-off frequency is varied depending on the IF sampling rate. Conditioning the $F_T$ modulation signal is performed, in some examples, by buffering the 0-3.3 v signal from the DSP's digital I/O. This buffered signal is then manipulated by a VGA which, in turn, drives a varactor diode within the microwave front end. This varactor diode then tunes the VCO. Due to the VGA, the $F_T$ modulation step, in some embodiments, is variable in 500 kHz steps.

The Digital Signal Processor (DSP) used for this RADAR sensor, in a set of embodiments, is an XMOS XS1-G4 multi-core processor on an XMOS XC-1A development board. The development board supplies regulated power to the remaining modules and controls the analog section a number of digital I/O pins. In one embodiment, the entire sensor includes five printed circuit boards with a combined mass of less than 150 grams. The electrical power consumption is dominated by the DSP, but overall power consumption of this embodiment remains less than 4.5 Watts for the entire system. Scaling this design to larger applications merely requires modifications to the microwave section of the sensor. Longer range sensing applications may require increases in the transmit power and modifications to the antenna's radiation pattern.

The RADAR system may be used, according to some embodiments, for target detection and collision avoidance. FIG. 4A is an illustration of 400 of a system of some embodiments in which detection and ranging functions of the RADAR may be determined and/or calibrated. The example of FIG. 4A includes a dihedral RADAR reflector with an RCS or two square meters. As FSK-CW RADAR types require mobbing targets, the reflector is mounted on an oval track, labeled as reflector path in FIG. 4. The reflector traverses the track with a nominal speed of 0.5 m/s. As the reflector follows a clockwise oval path passing in and out of the antenna's main lobe, large variations in the detected phase (both positive and negative) in addition to variations in the target velocity are observed. As the RADAR samples the phase continuously, inputs to the Kalman filter are restricted to when the reflector travels through the region of interest shown in FIG. 4A as beginning at the left-most triangle, and ending at the right-most triangle. This real-time selection is done, in some embodiments, in the complex frequency domain by accepting phase measurements with a negative magnitude and corresponding to a particular FFT bin (essentially restricting the sample selection to receding targets with the reflector's nominal velocity). This is done to eliminate multipath reflections and to isolate the section when the reflector travels through the region of interest. The results of an exemplary test are shown in FIG. 4B. The non-linear line of the graph indicates the filtered phase data, while the upper and lower lines indicate the acceptable phase bounds corresponding to the length of the region of interest. The sinusoidal behavior of the detected phase is explained by noting that as the reflector passes through the region of interest, the phase measurement increases monotonically. When the reflector leaves the region of interest, the range values are no longer accepted until the reflector re-enters the region of interest and is re-acquired by the RADAR. The point of re-acquisition is at a lower range than the last known location due to the oval nature of the track, the measured range values are therefore lower.

Figure 5:
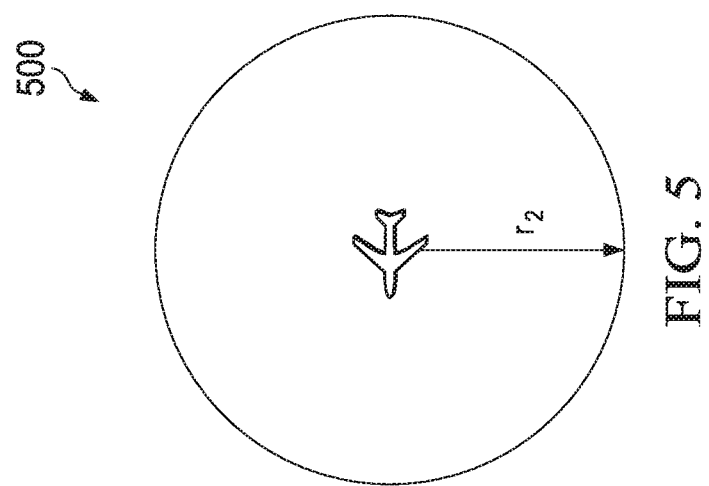
FIG. 5 is an illustration of a clearance region associated with a host vehicle according to various embodiments.
Figure 6:
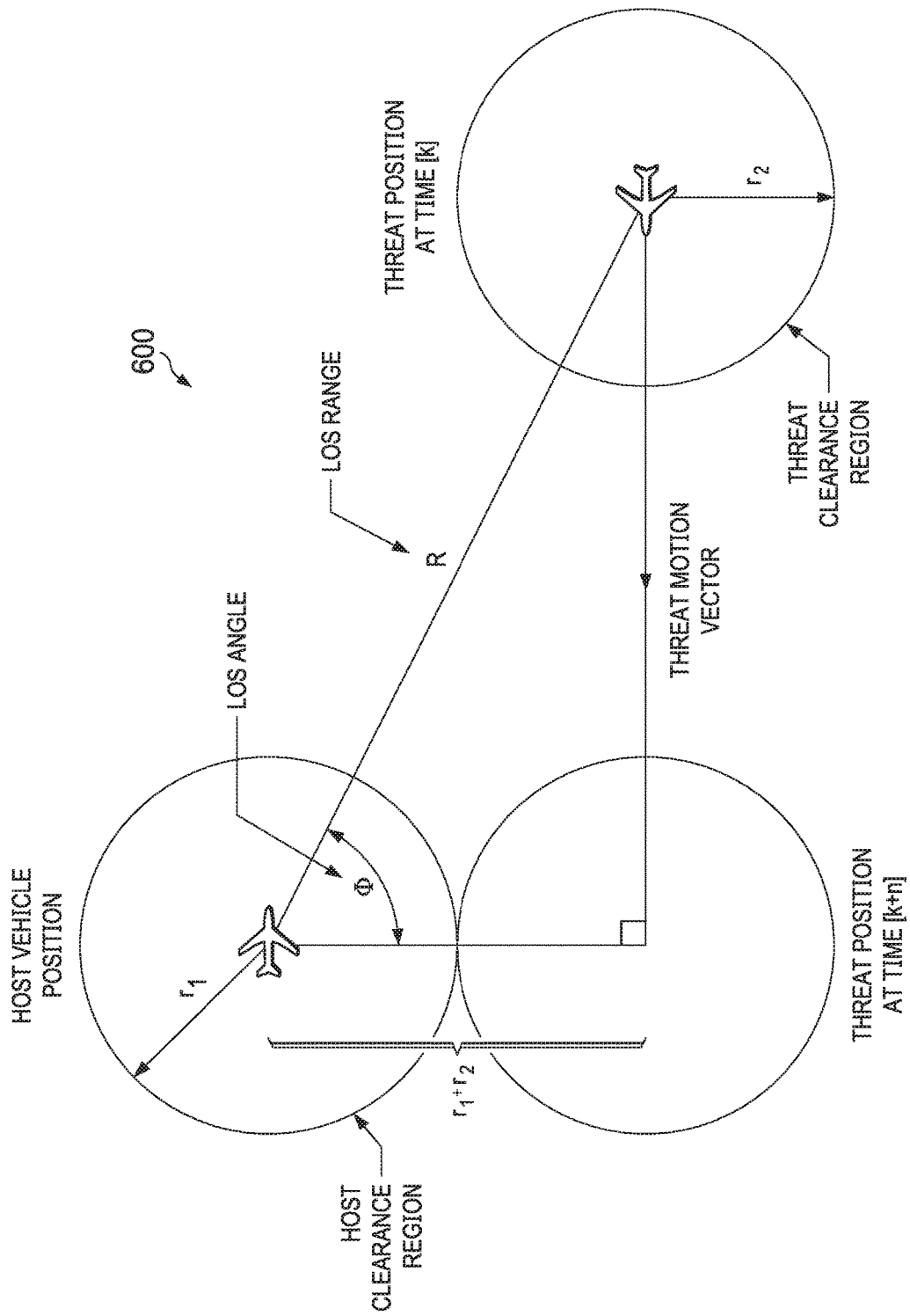
FIG. 6 is an illustration of host and target vehicle clearance regions at various times according to various embodiments.

As discussed above, various embodiments of different RADAR systems may be used for collision avoidance. There are several methods that may be used to accomplish collision avoidance. In traditional aircraft collision avoidance systems, altitude separation may be implemented, using current transponder systems that are included with aircraft. In plane maneuvers may also be utilized to avoid collisions, such as through the use of potential field models, mixed integer linear programming, dynamic window approach models, and collision cones. In any event, collision may be detected based on the angular rate of change of the line of sight (LOS) vector, i.e. proportional guidance. A "perfect" collision requires a null LOS angular rate with simultaneously decreasing range. As each vehicle has a non-zero size, a clearance region around it (denoted by $r_2$) is assumed, such as indicated in the illustration 500 of FIG. 5. Clearance region sizes, in some embodiments, vary depending on the identity of the opposing aircraft. FIG. 6 is an illustration 600 of a host vehicle and a threat vehicle, with associated clearance regions, at times k and k+n, and distance required to avoid intersection of the clearance regions associated with each vehicle, which is the summed clearance region radii. Perfect collisions are defined by $$\frac{d\phi}{dR} = 0.$$

However, low values of $$\frac{d\phi}{dR}$$

may cause the minimum range between vehicles to fall below the summed clearance region radii, and therefore there is a value of $$\frac{d\phi}{dR}$$

at every range above the summed clearance region radii that results in safe trajectories. The boundary between safe trajectories and collision paths is defined by $$\frac{d\phi}{dR} = \frac{r_1 + r_2}{R^2 \sqrt{\left|1 - \frac{(r_1+r_2)^2}{R^2}\right|}}.$$

Figure 7:
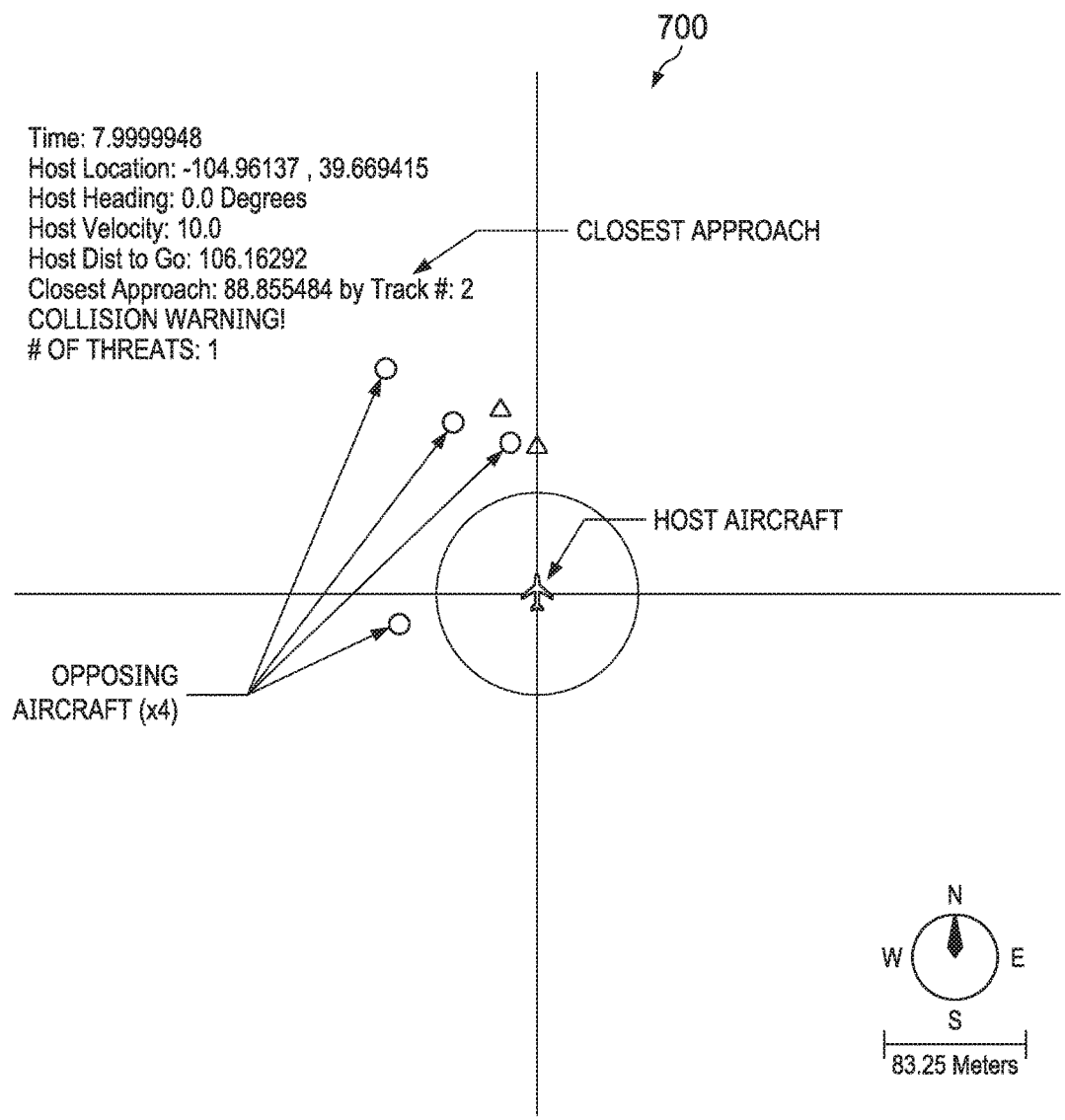
FIG. 7 is an illustration of an exemplary airspace simulation environment used to evaluate collision avoidance maneuvers.
Figure 8:
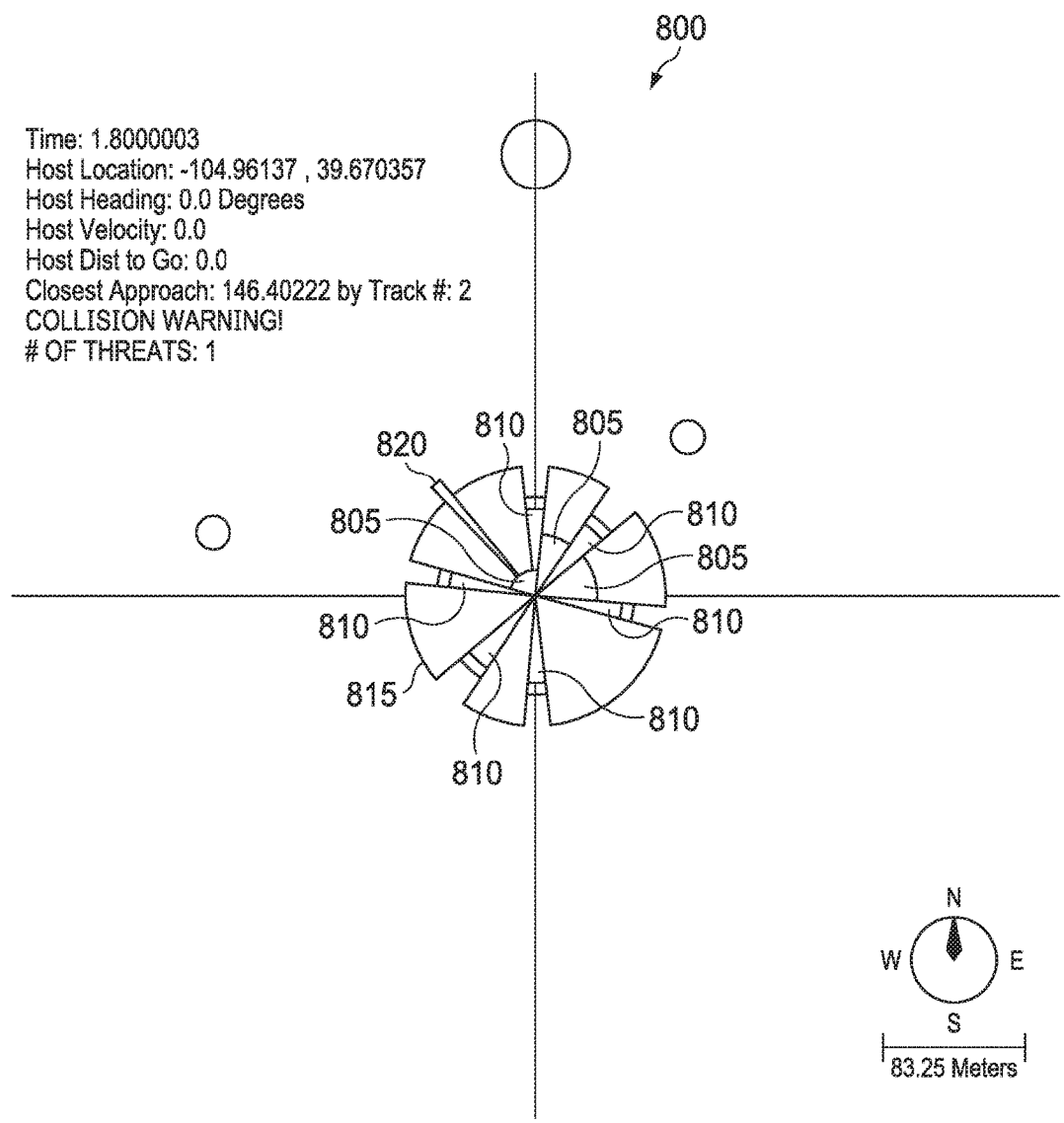
FIG. 8 is another illustration of an exemplary airspace simulation environment in this case with a collision avoidance overlay.

Thus, according to some embodiments, the RADAR system may output information related to potential collision target vehicles and a range of safe trajectories associated therewith. For example, FIG. 7 is an illustration 700 that shows a host aircraft and a number of opposing aircraft. Based on the illustration, the aircraft labeled number 2 poses a current collision threat, as the aircraft would come within the clearance region of the host aircraft were the host aircraft to continue on an existing trajectory. FIG. 8 illustrates another example in which three targets are present. Headings in areas 805 in this example illustrate headings that would avoid a collision and that the vehicle can reach. Headings 810 illustrate headings that would lead to a collision, and headings 815, illustrated as extending beyond headings 805 and 810, illustrate headings that would avoid a collision. Heading 820, in this embodiment, illustrates the selected collision avoidance heading.

As described earlier, advanced control strategies for unmanned UAVs require both detection and identification of one or more targets that may be in proximity to the UAV. In order to detect the presence of a target of interest, various embodiments provide an ability to differentiate a given signature from the background scene within the range of the RADAR. In order to identify different targets, embodiments provide an ability to determine that a given signature matches one of a database of pre-recorded signatures of vehicle classes of interest. Fundamentally, both of these operations involve comparing a given "live" signature, with a library of pre-recorded signatures and determining which is the best match. In various embodiments, both the background signature and vehicle signatures are represented within a signature library, thereby allowing the system to perform detection and identification in the same computational step (i.e., if the live signature matches the background signature the best, then there is no target of interest within range).

As described above, one of the computational operations performed by the RADAR system is to match an incoming "live" signature against a library of pre-recorded vehicle signatures. In order to evaluate different algorithms efficiently, systems of some embodiments utilize a data collection mode of the RADAR to record a number of 256-sample signatures for vehicles of interest. Signatures may be acquired by, for example, having the RADAR system and target vehicles placed inside a reinforced concrete room. Identification is performed by calculating the best match across all vehicles using one or more matching algorithms.

Various embodiments use different algorithms to compute a single match value when executed on a library signature and live signature pair. The vehicle corresponding to the library signature that exhibits the best match with the live signature is selected. Several algorithms may be used, such as:

Sum of Absolute Differences (SAD)—The total difference between the two signatures is calculated by adding the absolute value of differences between the 256 samples. The match with the smallest total differences is taken as best.

Sum of Squared Differences (SSD)—The total difference between the two signatures is calculated by adding the square of differences between the 256 samples. The match with the smallest total difference is taken as best.

Euclidean Distance (ED)—The total distance between the two signatures is calculated by taking the square root of the sum of squared differences. The match with the smallest total difference is taken as best.

Correlation (C)—The correlation between the two signatures is calculated by taking the average pairwise product of the 256 samples. The match with the maximum correlation is taken as the best.

Utilizing the systems and algorithms described above, the RADAR system may differentiate between live targets, and also attach different clearance regions to different targets. Furthermore, in some embodiments, further parameters may be associated with identified targets, such as a maximum target airspeed, for example. Identification begins, in some embodiments, by recording the background Doppler signature which is then subtracted from subsequent measurements. The library signatures are stored in non-volatile memory on board the RADAR processor, or transmitted to the RADAR's processor by the UAVs mission control system as needed.

Figure 9:
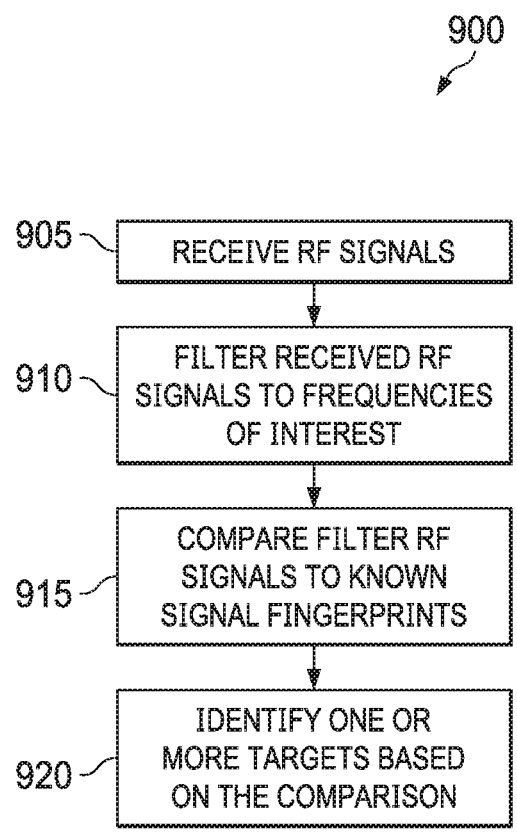
FIG. 9 is a flow chart illustration of exemplary operational steps for detection and other objects according to various embodiments.

With reference now to FIG. 9, operational steps 900 of an embodiment are described. The operations of FIG. 9 may be performed, for example, by one or more of the modules discussed with respect to FIGS. 2 and 3. Initially, at block 905, RF signals are received at an antenna located on the UAV. The RF signals are then filtered, as discussed above, at block 910. The filtered signals are compared to known signal fingerprints, at block 915. Based on the comparison, one or more targets are identified, at block 920. Avoidance maneuvers may be initiated based on the target identification, similarly as discussed above.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A radar apparatus,
   wherein the radar apparatus is configured to be mounted on an unmanned aerial vehicle (UAV) and wherein the radar apparatus and UAV together weigh less than 20 kg, the radar apparatus comprising:
   a microwave front end module configured to transmit and receive FSK-CW signals;
   an analog signal conditioning module coupled with the microwave front end module, the analog signal conditioning module configured to condition an intermediate frequency FSK-CW signal received from the microwave front end module by:
   multiplexing the intermediate frequency FSK-CW signal to two conditioning circuits to separate two phases of the intermediate frequency FSK-CW signal;
   pass each of the two phases through separate sample-and-hold circuits and band pass filters; and amplifying each of the two phases of the intermediate frequency FSK-CW signal through at leak two variable gain amplifiers; and filtering the each of two phases through separate variable cut-off frequency low pass filters;

and condition a transmit frequency modulation signal from a digital signal processing module by:

buffering the transmit frequency modulation signal; and amplifying the buffered signal by another variable gain amplifier;

an analog-to-digital converter configured to receive the conditioned intermediate frequency signals and send digitally converted versions of the conditioned intermediate frequency signals to the digital signal processor; and the digital signal processing module coupled with the analog signal conditioning module wherein the digital signal processing module is configured to detect the presence and range of one or more targets based on the digitally converted versions of the conditioned intermediate frequency signals.

2. The apparatus of claim 1, wherein the microwave front end module and digital signal processing module are modular components.

3. The apparatus of claim 1, wherein the microwave front end module comprises a fixed phase, planar, or patch antenna array.

4. The apparatus of claim 1, wherein the digital signal processing module is configured to identify one or more Doppler signatures of the one or more targets based on the digitally converted versions of the conditioned intermediate frequency signals and identify the one or more targets based on the Doppler signatures.

5. The apparatus of claim 4, wherein the digital signal processing module is configured to execute one or more signature matching algorithms for differentiating targets by their Doppler signature.

6. The apparatus of claim 5, further comprising a control module coupled with the digital signal processing module and configured to perform collision avoidance relative to one or more identified targets.

7. The apparatus of claim 1, further comprising a memory coupled with the digital signal processing module.

8. The apparatus of claim 7, wherein the memory comprises a plurality of prerecorded Doppler signatures of target classes of interest.

9. A method for target detection, comprising:

receiving RF FSK-CW signals at an antenna of a radar system;

conditioning an intermediate frequency FSK-CW signal received at the antenna by:

multiplexing the intermediate frequency FSK-CW signal to two conditioning circuits to separate two phases of the intermediate frequency FSK-CW signal;

pass each of the two phases through separate sample-and-hold circuits and band pass filters; and amplifying each of the two phases of the intermediate frequency FSK-CW signal through at least two variable gain amplifiers; and filtering the each of two phases through separate variable cut-off frequency low pass filters;

and condition a transmit frequency modulation signal from a digital signal processing module by:

buffering the transmit frequency modulation signal; and amplifying the buffered signal by another variable gain amplifier;

filtering the received RF signals to one or more frequencies of interest at the digital signal processing module;

comparing the filtered RF signals to known signals at the digital signal processing module; and identifying one or more targets based on the comparison.

10. The method of claim 9; wherein the comparing comprises:

determining a Doppler signature of one or more targets in the received RF signals; and executing one or more signature matching algorithms for differentiating targets by their Doppler signature.

11. The method of claim 10, wherein the executing comprises accessing a memory coupled with the digital signal processing module wherein the memory stores a plurality of prerecorded Doppler signatures of targets of interest.

* * * * *